United States Patent [19]
Chen

[11] Patent Number: 5,983,747
[45] Date of Patent: Nov. 16, 1999

[54] AUXILIARY HANDLEBAR OF BICYCLE

[75] Inventor: Chun-Lang Chen, Changhua, Taiwan

[73] Assignee: Yu-Chuan Yen, Changhua, Taiwan

[21] Appl. No.: 09/109,929

[22] Filed: Jul. 2, 1998

[51] Int. Cl.⁶ .................................................. B62K 21/26
[52] U.S. Cl. ..................... 74/551.9; 74/551.8; 16/110 R
[58] Field of Search ............................... 74/551.8, 551.9, 74/551.1; 16/110 R, 111 R, DIG. 12; 280/288.4

[56] References Cited

U.S. PATENT DOCUMENTS

| | | | |
|---|---|---|---|
| 571,394 | 11/1896 | Prindle et al. ........................... | 74/551.8 |
| 605,626 | 6/1898 | Blanchard, Jr. ........................ | 74/551.9 |
| 4,191,065 | 3/1980 | Golobay et al. ........................ | 74/551.9 |
| 5,235,871 | 8/1993 | Yamazaki et al. ..................... | 74/551.8 |
| 5,425,285 | 6/1995 | Cheng ..................................... | 74/551.8 |

FOREIGN PATENT DOCUMENTS

| | | | |
|---|---|---|---|
| 18441 | 8/1996 | United Kingdom .................. | 74/551.8 |

*Primary Examiner*—Tamara L. Graysay
*Assistant Examiner*—Chong H. Kim
*Attorney, Agent, or Firm*—Bacon & Thomas, PLLC

[57] ABSTRACT

An auxiliary handlebar is mounted at one end of a bicycle handlebar and is composed of a main body, a sleeve fitted over the main body, and a cap fastened with the top end of the main body. The main body is fastened at the bottom end thereof with a fastening mount which is engaged with the one end of the bicycle handlebar. The main body is provided at the top end thereof with an outer threaded portion and a recessed portion. The sleeve is provided at the top end thereof with a protrusion and is rotatably fitted over the main body such that the protrusion is movably received in the recessed portion of the main body. The cap is provided with an inner threaded portion and fastened with the top end of the main body such that the inner threaded portion of the cap is engaged with the outer threaded of the top end of the main body.

7 Claims, 5 Drawing Sheets

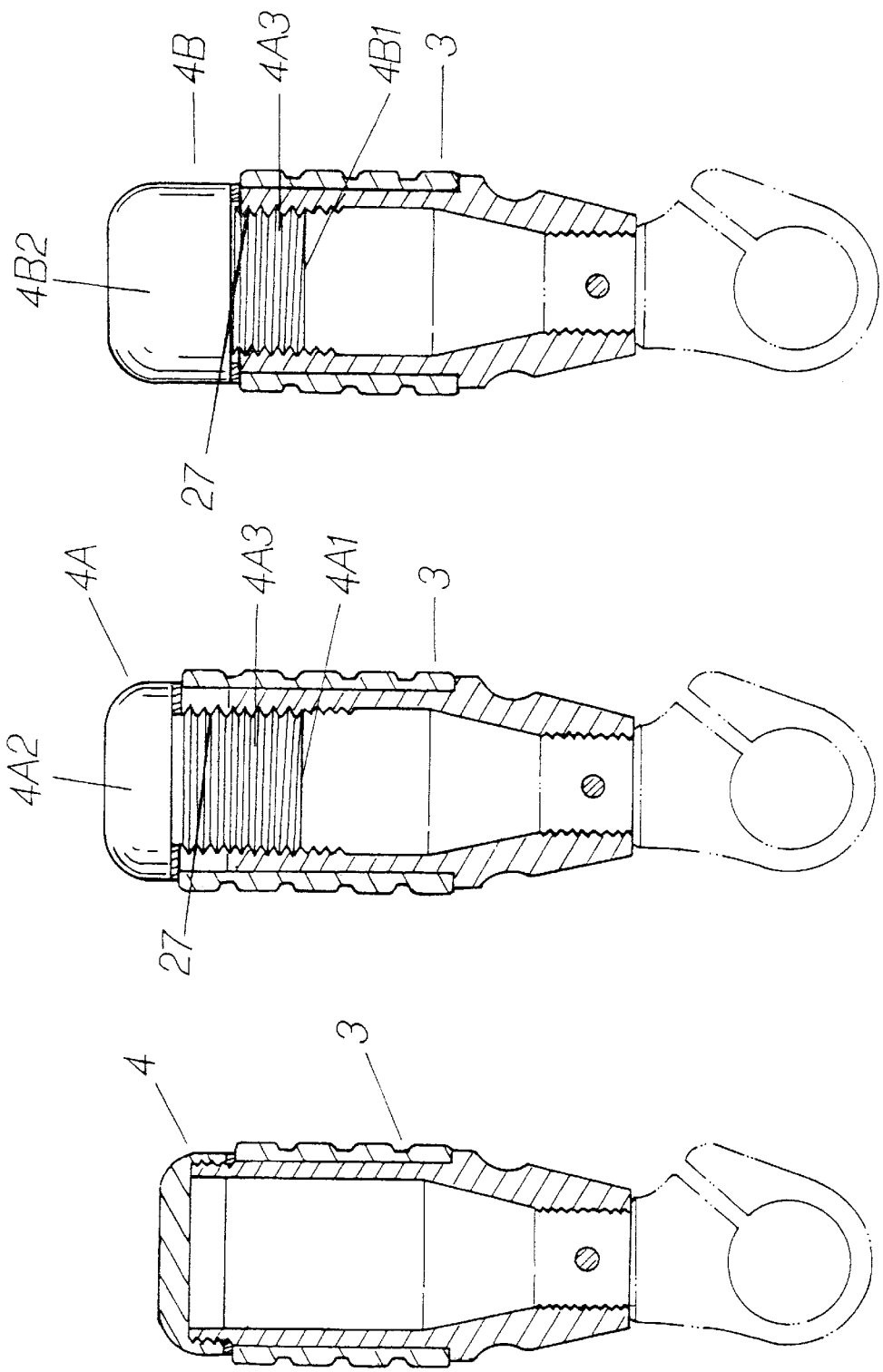
FIG.6-A
FIG.6-B
FIG.6-C

_5,983,747_

AUXILIARY HANDLEBAR OF BICYCLE

FIELD OF THE INVENTION

The present invention relates generally to a bicycle, and more particularly to an auxiliary handlebar of the bicycle.

BACKGROUND OF THE INVENTION

The conventional auxiliary handlebar of the bicycle to facilitate the maneuvering of the handlebar. The handlebar of the bicycle is generally provided with two such auxiliary handlebars, which are fastened with both ends of the handlebar. Such a conventional auxiliary handlebar as described above is generally defective in design in that it is rather monotonous at best, and that it can not be adjusted, and further that it can not be gripped firmly due to the palm perspiration of the bicyclist. As a result, the conventional auxiliary handlebar of the bicycle has never caught the fancy of the consumers at large.

SUMMARY OF THE INVENTION

The primary objective of the present invention is therefore to provide a bicycle handlebar with two auxiliary handlebars free from the drawbacks of the conventional auxiliary handlebars described above.

The objective, features and functions of the present invention will be readily understood upon a thoughtful deliberation of the following detailed description of the present invention with reference to the accompanying drawings.

BRIEF DESCRIPTION OF THE DRAWINGS

FIG. 6A shows a longitudinal sectional view of the present invention in combination.

FIG. 6B shows another longitudinal sectional view of the present invention in combination.

FIG. 6C shows still another longitudinal sectional view of the present invention in combination.

DETAILED DESCRIPTION OF THE INVENTION

Figure 1:
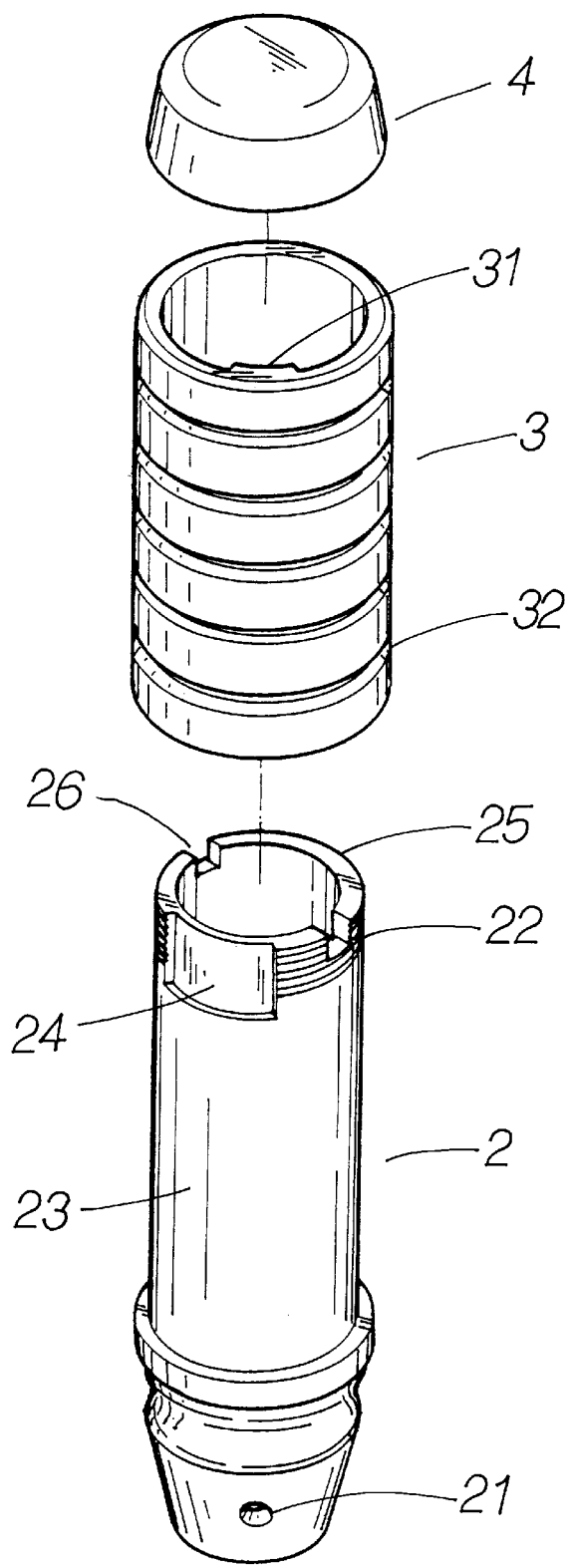
FIG. 1 shows an exploded view of the present invention.
Figure 2:
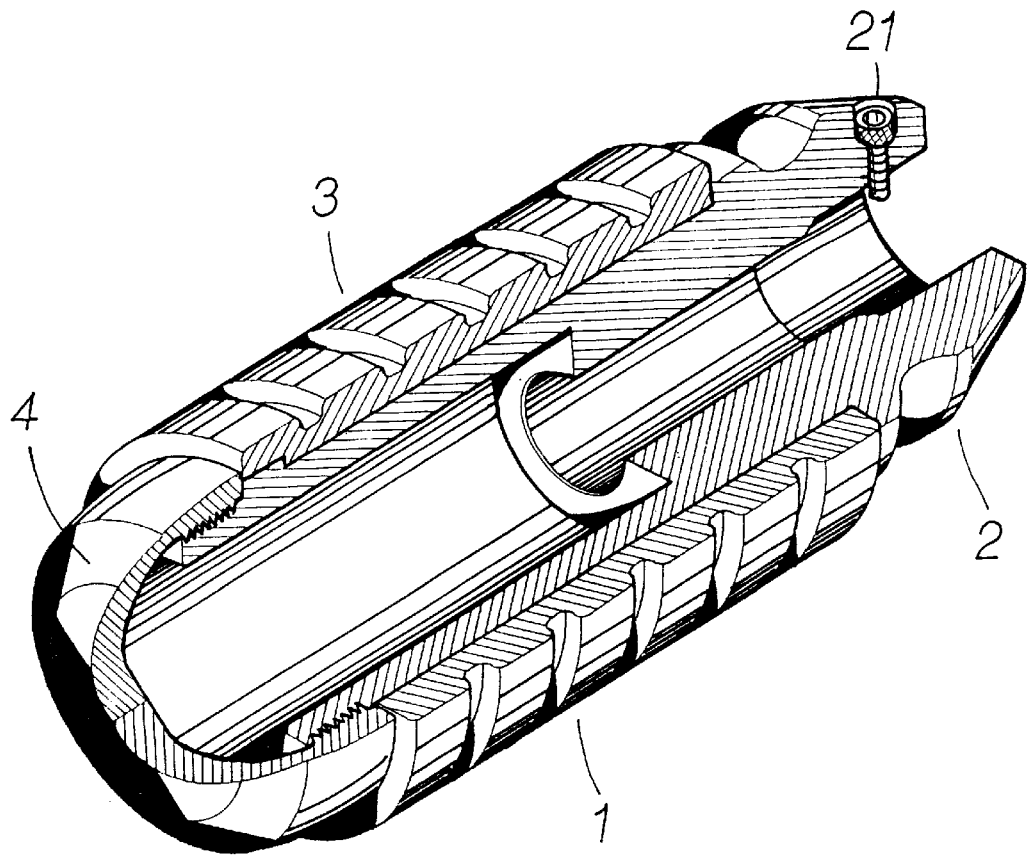
FIG. 2 shows a longitudinal sectional view of the present invention in combination.
Figure 5:
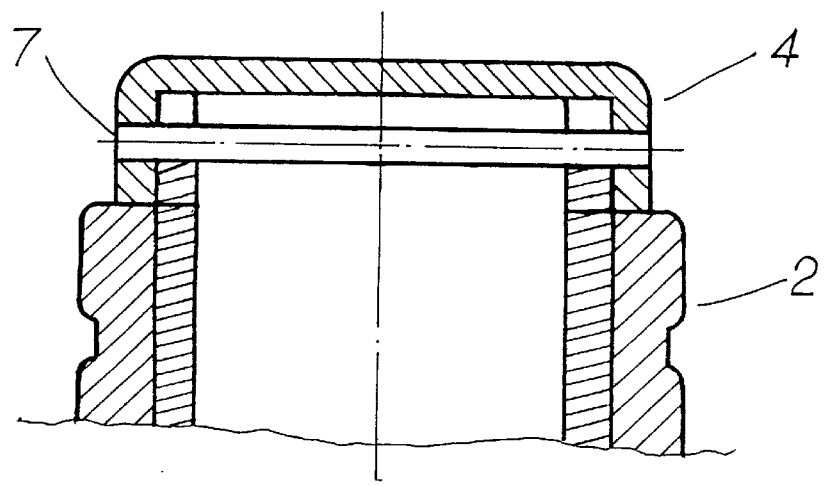
FIG. 5 shows a sectional view of the present invention.
Figure 3:
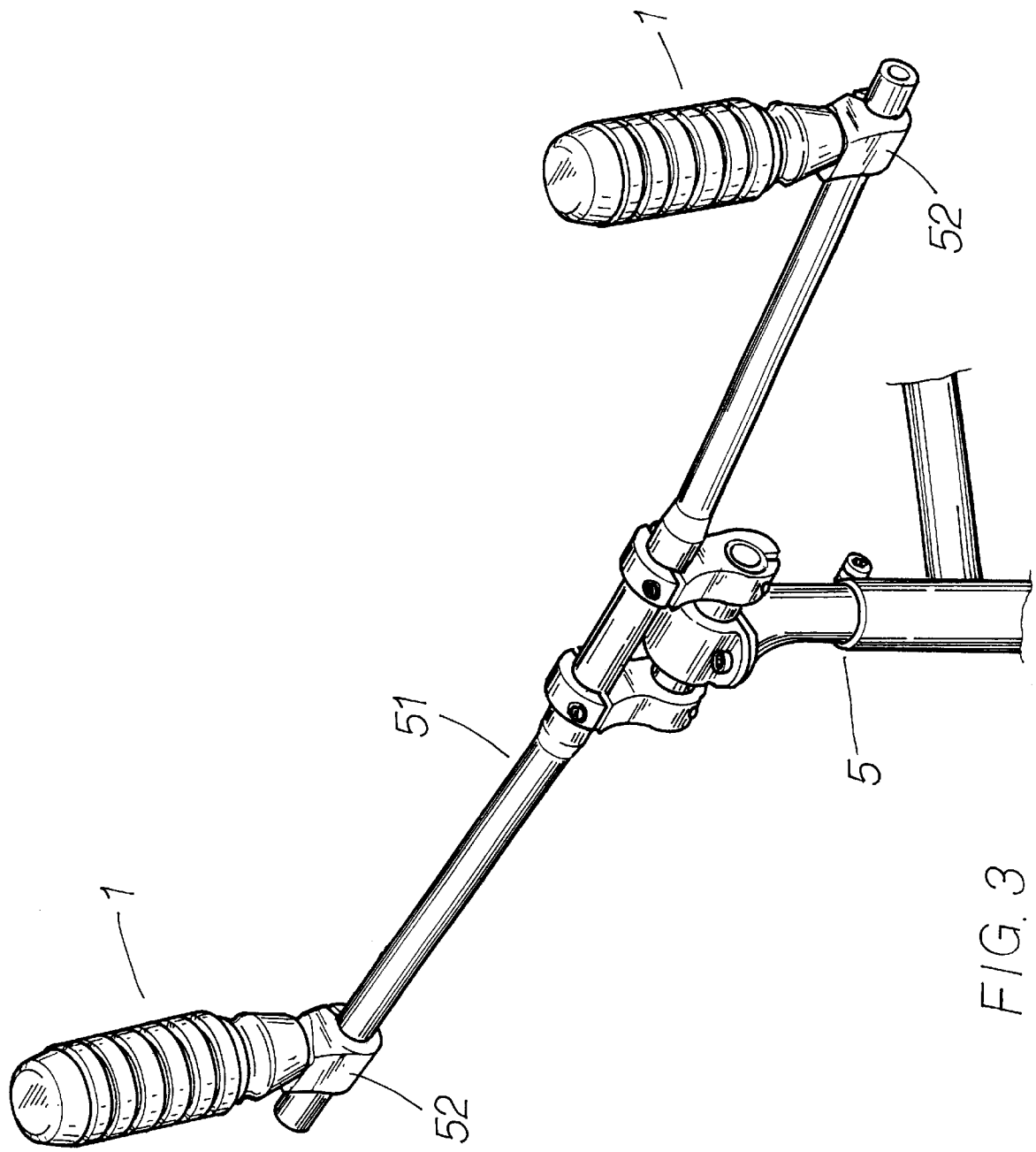
FIG. 3 shows a schematic view of the present invention mounted on a bicycle handlebar.

As shown in FIGS. 1–3, an auxiliary handlebar 1 embodied in the present invention is composed of a main body 2, a sleeve 3, and a cap 4. The auxiliary handlebar 1 is fastened at one end of a handlebar 51 of a bicycle 5, as shown in FIG. 3, by means of a fastening mount 52 to which the main body 2 may be secured by means, for example, of a set screw threaded into an opening 21, as illustrated in FIGS. 1 and 2. The main body 2 is further provided at the top end thereof with an outer threaded portion 22, a recessed portion 24, a rim 25 having a cut 26. Located between the bottom end and the top end of the main body is a smooth portion 23.

The sleeve 3 is provided at the top edge thereof with a protrusion 31 and in the outer surface thereof with a plurality skid-proof fine grooves 32. The sleeve 3 is rotatably fitted over the main body 2 such that the protrusion 31 is received movably in the recessed portion 24 of the main body 2.

The cap 4 is provided with an inner threaded portion (not shown in the drawing). The cap 4 is fastened with the top end of the main body 2 such that the inner threaded portion of the cap 4 is engaged with the outer threaded portion 22 of the main body 2.

Figure 4:
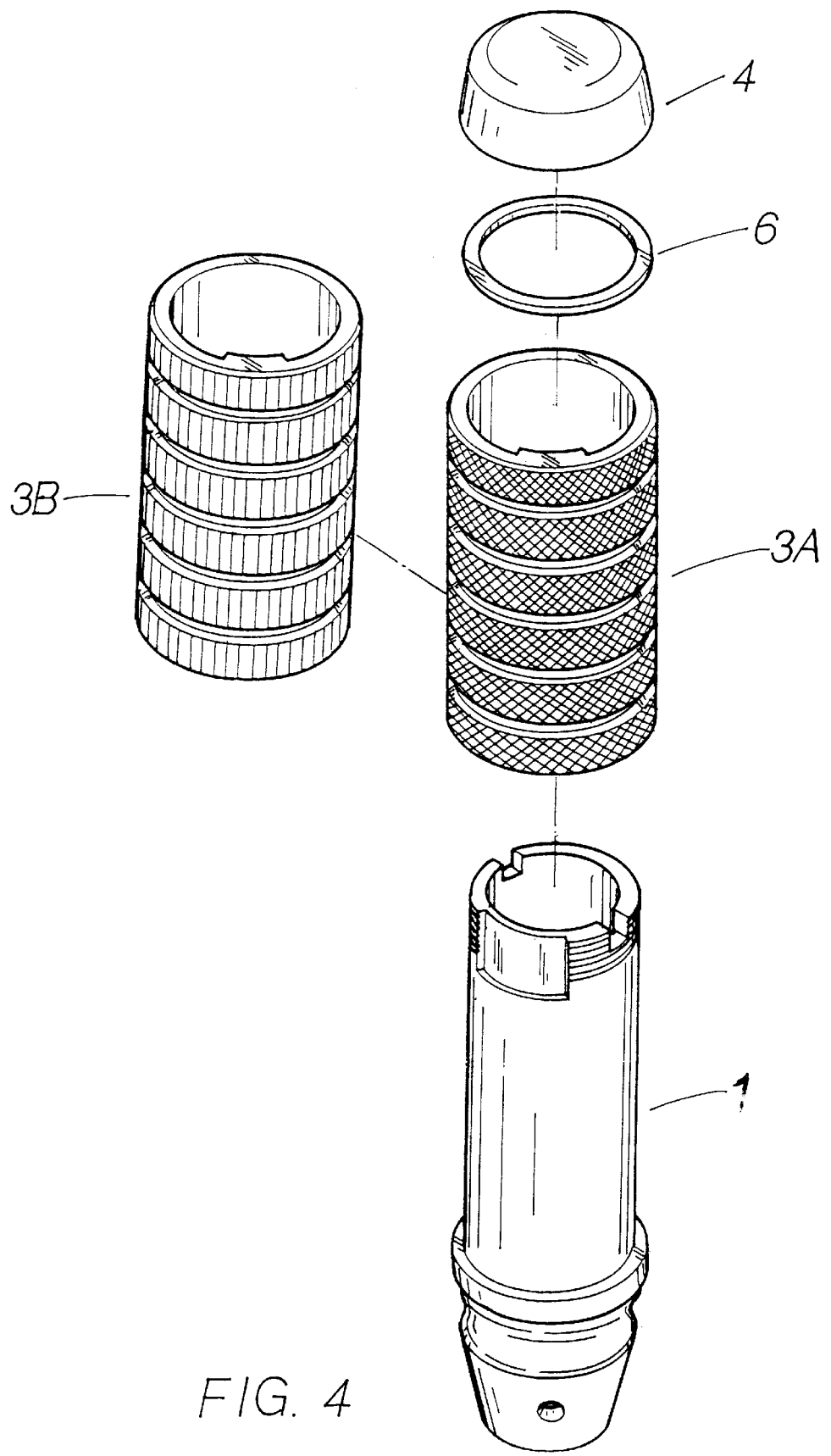
FIG. 4 shows an exploded view of another preferred embodiment of the present invention.

As shown in FIG. 4, an auxiliary handlebar 1 of another preferred embodiment of the present invention is composed of a main body 2, two sleeves 3A and 3B, a cap 4, a washer 6, and a pin 7. The sleeves 3A and 3B are provided respectively with an embossed outer surface to facilitate the gripping of the auxiliary handlebar 1. Both top end of the main body 2 and the cap 4 are provided respectively with a fastening hole (not shown in the drawing). The cap 4 is fastened with the top end of the main body 2 by the pin 7 in conjunction with the washer 6 such that the pin 7 is received in the fastening holes of the cap 4 and the top end of the main body 2. The sleeves 3A and 3B are fitted over the main body 2 such that the sleeves 3A and 3B can not be rotated.

The embodiments of the present invention described above are to be deemed in all respects as being merely illustrative and not restrictive. Accordingly, the present invention may be embodied in other specific forms without deviating from the spirit thereof. For example, the top end of the main body 2 is provided with an inner threaded portion 27, whereas the cap 4A is of a T-shaped construction, as shown in FIG. 6B. The cap 4A has a head 4A2 and a shank 4A1 which is provided with an outer threaded portion 4A3. The cap 4A is fastened with the main body 2 such that the outer threaded portion 4A3 of the shank 4A1 of the cap 4A is engaged with the inner threaded portion 27 of the main body 2. The shank 4A1 is longer than the head 4A2. The present invention can be further modified in form. For example, a modified cap 4B has a head 4B2 and a shank 4B1 which is shorter than the head 4B2 and is provided with an outer threaded portion 4B3 engageable with the inner threaded portion 27 of the main body 2. The total length of the auxiliary handlebar 1 of the present invention can be adjusted by means of the caps of various lengths. The present invention is therefore to be limited only by the scopes of the following appended claims.

What is claimed is:

1. An auxiliary handlebar fastened at one end of a handlebar of a bicycle, said auxiliary handlebar comprising:

a main body provided at a bottom thereof with a threaded hole for fastening said main body with a fastening mount engageable with the handlebar of the bicycle, said main body further provided at a top end thereof with an outer threaded portion and a recessed portion;

a sleeve provided at a top edge thereof with a protrusion and in an outer surface thereof with a plurality of skid-proof fine grooves, said sleeve being rotatably fitted over said main body such that said protrusion is movably received in said recessed portion of said main body; and a cap provided with an inner threaded portion and fastened with said top end of said main body such that said inner threaded portion of said cap is engaged with said outer threaded portion of said main body.

2. The auxiliary handlebar as defined in claim 1, wherein said top end of said main body is provided with a fastening hole; wherein said cap is provided with a fastening hole; and wherein said cap is fastened with said top end of said main body by a pin which is received in said fastening holes of said cap and said top end of said main body.

3. The auxiliary handlebar as defined in claim 1, wherein said cap is fastened with said main body in conjunction with a washer which is located between said cap and said sleeve.

4. The auxiliary handlebar as defined in claim 1, wherein said sleeve is provided with a skid-proof embossed outer surface.

5. An auxiliary handlebar fastened at one end of a handlebar of a bicycle, said auxiliary handlebar comprising:

A main body provided at a bottom thereof with a threaded hole for fastening said main body with a fastening mount engageable with the handlebar of the bicycle, said main body further provided at a top end thereof with a recessed portion;

A sleeve provided at a top edge thereof with a protrusion and in an outer surface thereof with a plurality of skid-proof fine grooves, said sleeve being rotatably fitted over said main body such that said protrusion is movably received in said recessed portion of said main body; and a cap is of a T-shaped construction and is composed of a head and a shank provided with an outer threaded portion; wherein said main body is provided in said top end thereof with an inner threaded portion; and wherein said cap is fastened with said main body such that said outer threaded portion of said shank of said cap is engaged with said inner threaded portion of said top end of said main body.

6. The auxiliary handlebar as defined in claim 5, wherein said head of said cap has a thickness smaller than a length of said shank of said cap.

7. The auxiliary handlebar as defined in claim 5, wherein said head of said cap has a thickness greater than a length of said shank of said cap.

* * * * *